May 21, 1957 A. DUNBAR 2,793,184
ELECTRIC ZIGZAG LABYRINTH OZONE GENERATOR
Filed June 29, 1954 3 Sheets-Sheet 1
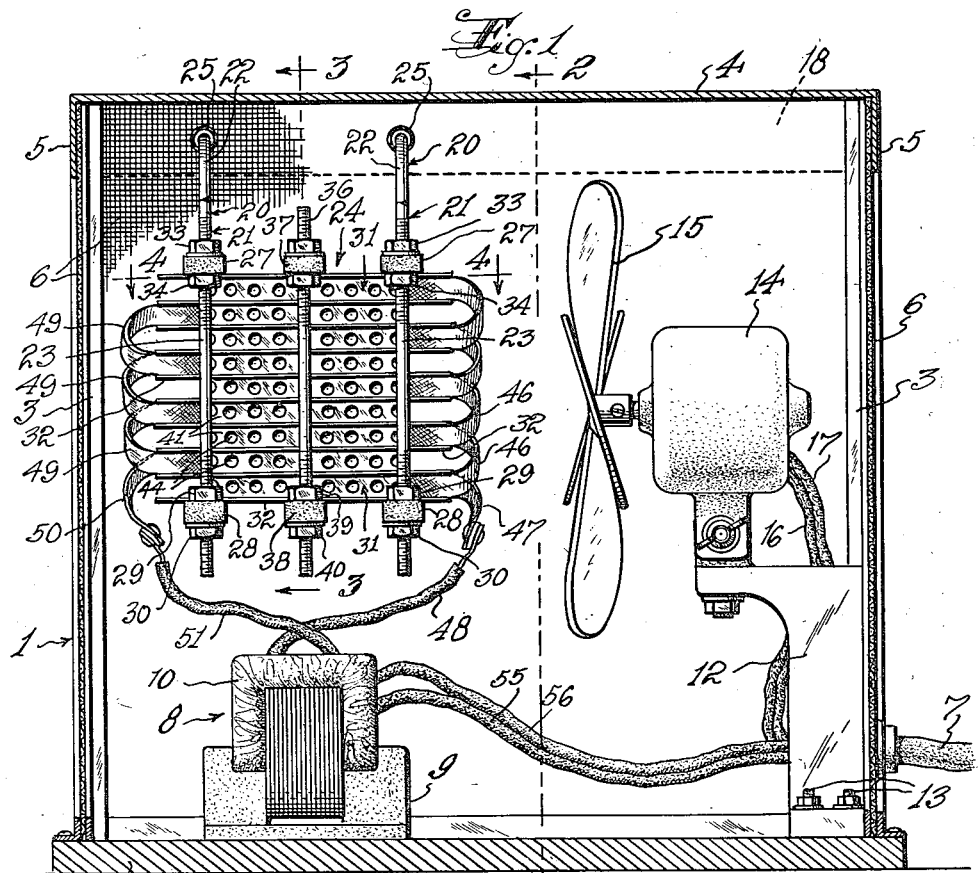
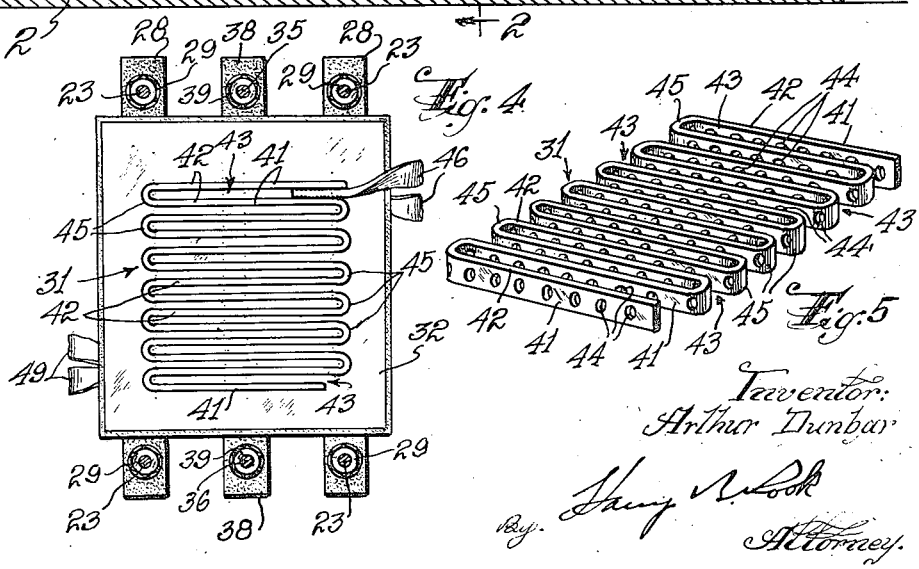

May 21, 1957
A. DUNBAR
2,793,184
ELECTRIC ZIGZAG LABYRINTH OZONE GENERATOR
Filed June 29, 1954
3 Sheets-Sheet 2
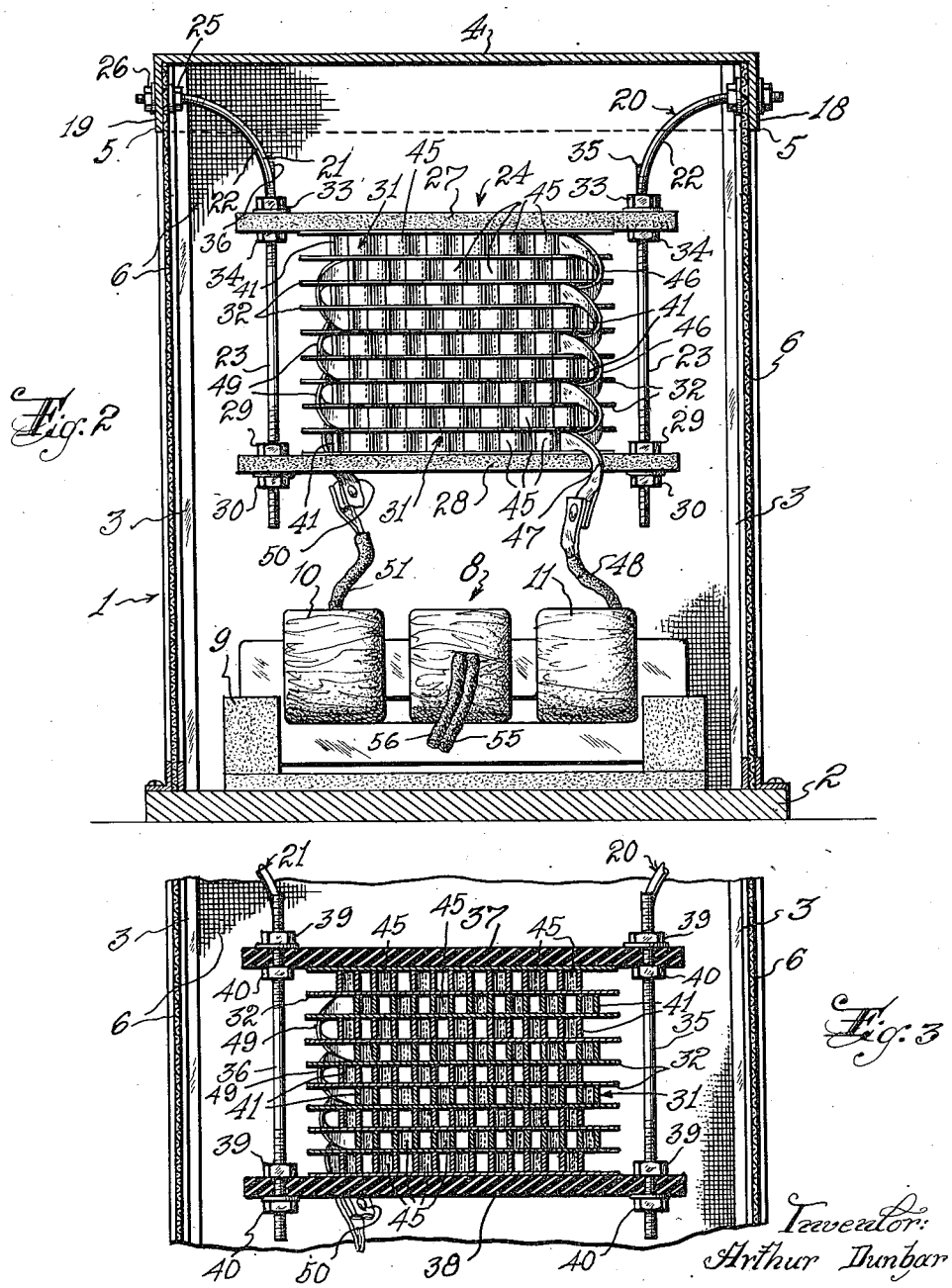

May 21, 1957  A. DUNBAR  2,793,184
ELECTRIC ZIGZAG LABYRINTH OZONE GENERATOR
Filed June 29, 1954  3 Sheets-Sheet 3
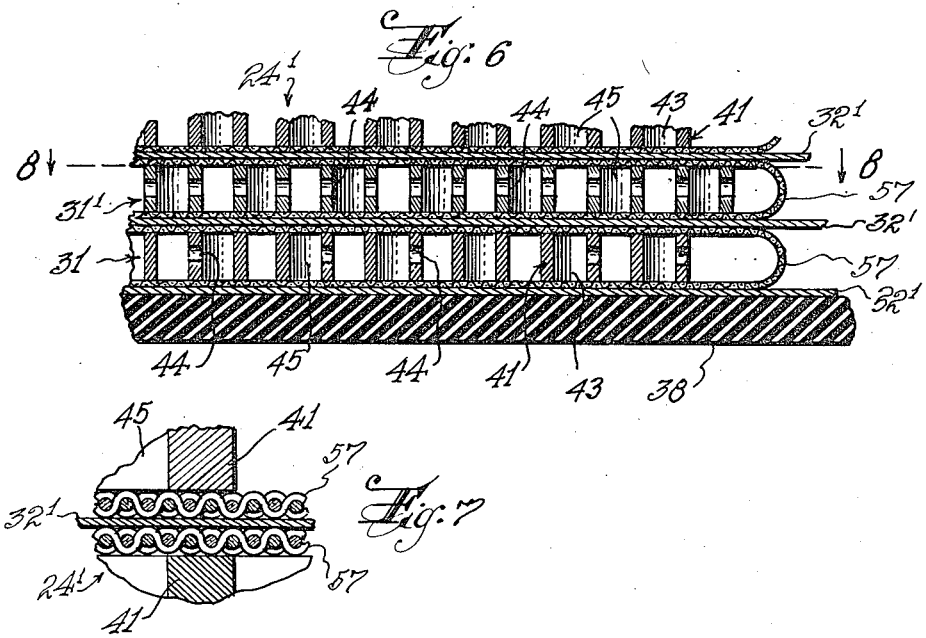
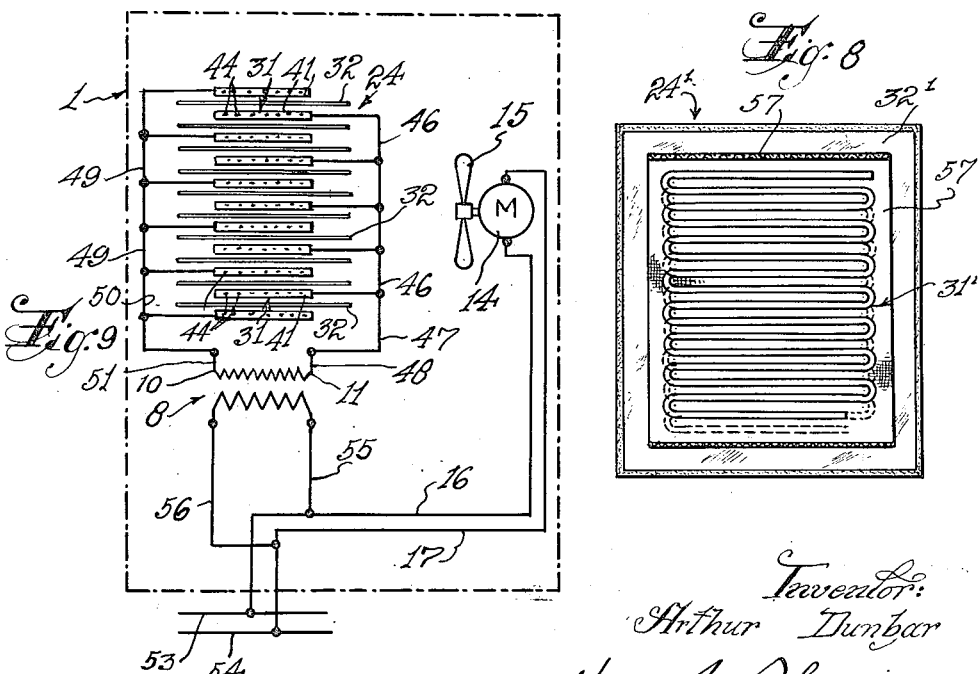

United States Patent Office 2,793,184
Patented May 21, 1957

2,793,184

ELECTRIC ZIGZAG LABYRINTH OZONE GENERATOR

Arthur Dunbar, Union City, N. J.

Application June 29, 1954, Serial No. 440,138

3 Claims. (Cl. 204—318)

This invention relates to an electric ozone generator or device for converting the normal diatomic oxygen of the air into the triatomic form known as ozone.

A primary object of the present invention is to provide apparatus for generating ozone which is portable and compact and which is capable of effectively ozonizing a large volume of air.

Another object of the invention is to provide an ozone generator with electrodes arranged in the form of a zigzag labyrinth in order to produce a plurality of zigzag portions for generating a plurality of relatively small electrical discharges so distributed that they may effectively ozonize a large volume of air.

A further object of the invention is to provide an ozone generator with electrodes arranged in the form of a zigzag labyrinth in order to produce a plurality of zigzag heat absorbing passages spaced to secure rapid cooling of the generator thereby preventing buckling or warping of the electrodes.

Another object of the invention is to so construct the ozone generator that the electrodes and dielectric may readily be removed therefrom for purposes of cleaning, inspection and repair.

A specific object of the invention is to provide an improved form of electrode for use in an ozone generator constructed in zigzag formation and provided with a plurality of air vent holes therein whereby a plurality of such electrodes may be stacked with dielectric plates therebetween yet complete ventilation of the stacked electrodes is ensured.

It is further proposed to produce an ozone generator which is simple and sturdy in construction and which can be manufactured and sold at a reasonable cost.

Other objects and advantages of the invention will be apparent from the description thereof to follow taken in connection with the accompanying drawings in which—

Figure 1 is a front elevational view of an ozone generator embodying one form of the invention, shown installed in a casing, the casing being shown in section along a vertical plane parallel to the front.

Figure 2 is a vertical sectional view taken on the plane of the line 2—2 of Figure 1.

Figure 3 is a vertical sectional view taken on the plane of the line 3—3 of Figure 1.

Figure 4 is a horizontal sectional view taken on the plane of the line 4—4 of Figure 1.

Figure 5 is a perspective view of an electrode used with the generator.

Figure 6 is an enlarged fragmentary vertical sectional view of an electrode assembly unit embodying a modified form of the invention.

Figure 7 is a fragmentary vertical sectional view of an electrode of Figure 6 on an enlarged scale.

Figure 8 is a reduced horizontal sectional view taken on the plane of the line 8—8 of Figure 6.

Figure 9 is a wiring diagram of the generator shown in Figure 1.

The ozone generator according to the present invention operates on the electric discharge principle by which oxygen may be converted into the ozone form by the passage therethrough of an electric discharge. In Figures 1 to 5, inclusive, an ozone generator embodying the first form of the invention is shown installed in a portable casing 1 having a base 2 and corner posts 3 for supporting a cover 4 provided with a downwardly extending flange 5 therearound. The casing is open on all sides and the openings are protected by screens 6. The generator is preferably energized from the ordinary source of lighting current which is used for lighting, and for this purpose the portable casing is provided with a connection cord 7 having the usual plug (not shown) for engagement with the wall socket.

As shown in Figure 1, the generator includes a step-up transformer 8 mounted on an insulating cradle support 9 formed of a phenolic condensation compound, such as Bakelite and suitably secured to the base, adjacent one side of the casing. The ratio of the transformer is such as to provide a voltage on the order of 7500 volts at the secondary terminals 10 and 11. A bracket 12 extends upwardly from the base of the casing at the other side and is fastened by bolts 13. The bracket hingedly supports a motor 14 for driving a fan 15. Conductors 16 and 17 connect the motor to the connector cord 7.

The front and rear portions 18 and 19, respectively, of the flange 5 of the cover 4 and the adjacent screens 6, at points over the transformer 8, are formed with aligned openings for receiving pairs of elongated rigid rods 20, 20 and 21, 21, respectively. The rods as seen in Figures 1 and 2 have curved upper portions 22 which continue into straight portions 23 extending downwardly into the interior of the casing remote from the front and rear of the casing for supporting the electrode assembly unit indicated generally at 24. The extremities of the curved portions of the rods are screw threaded and extend loosely through the openings in the flange portions and screens where they are secured to the flange portions by flanged inner and outer nuts 25 and 26, respectively. The inner nuts secure the screens to the flange of the cover. The rods extend loosely through aligned openings in the ends of a pair of upper bars 27, 27 and in the ends of a pair of lower bars 28, 28 formed of plastic or other suitable material. The lower bars are fastened to the threaded ends of the straight portions of the rods by upper and lower nuts 29 and 30, respectively, and serve to support the ozonizer unit 24, between the pairs of front and rear rods 20, 20 and 21, 21, respectively.

The ozonizer unit proper includes a series of electrodes 31 positioned in superposed stacked relation and separated by dielectric plates 32 formed of suitable dielectric material such as mica or the like. The electrodes and dielectric plates are clamped together in abutting relation by the upper insulating bars 27, 27 which are adjustably positioned along the straight portions of the rods and are secured in adjusted clamping position by upper and lower nuts 33 and 34, respectively, coacting with the threads on the upper ends of the straight portions. Additional clamping means is provided by a pair of front and rear rods 35 and 36, respectively, loosely passing through upper and lower insulating bars 37 and 38, respectively, positioned intermediate the upper and lower bars 27, 27 and 28, 28, respectively. The screw threaded ends of the rods 35 and 36 receive inner and outer nuts 39 and 40, respectively, by means of which the electrodes and dielectric plates are clamped together.

The dielectric plates 32 are of a sufficient size to fit between the pairs of rods 20, 20 and 21, 21 but are preferably larger in area than the area of the electrodes 31 and extend beyond the electrodes on all sides as shown in Figure 4, for example, to an extent of approximately three-fourths of an inch. The edges of the plates are preferably dipped in collodion in order to prevent flaking of the mica. Mica plates of .013 inch thickness have been found satisfactory in use in the apparatus as shown.

The electrodes each comprises an elongated flat strip of metal such as aluminum which is turned upon itself along its length to form a plurality of legs 41 arranged in offset or zigzag or corrugated fashion, producing a plurality of zigzag or corrugated straight line edges 42 and producing a plurality of spaces 43 between the legs arranged in staggered relation. The strip is preferably formed with a plurality of closely spaced air vent holes 44 throughout its length. An electrode with legs 41 about .032 inch thick and ⅜ inch wide, with a ¼ inch space between the legs has been found to give excellent results in service. The diameter of the vent holes 44 may be as large as desired. When assembled, the electrodes 31 are arranged in superposed relation with their flat zigzag edges 42 in alignment with each other. The base portions or loops 45 of alternate electrodes in the stack are positioned in the open ends of the passages 43 of the adjacent electrodes as more clearly shown in dotted lines in Figure 8 so that the space 43 of alternate electrodes open at opposite sides of the stack.

As shown in Figure 1, the lowermost electrode 31 and each alternate electrode thereabove in the stack form a set and are connected together on one side of the stack by U-shaped conductors 46, the end portions of which are given a twist and roughened and inserted between adjacent dielectric plates 32 and between pairs of adjacent leg portions 41 of the electrodes in intimate contacting relation therewith. A conducting strip 47 similarly connected at one end to the lowermost electrode 31 and connected at its other end to a conductor 48 connects said lowermost electrode and the alternate electrodes thereabove of the set and the conductors 46 to one side of the transformer 8 represented by the secondary 11.

The next to the lowermost electrode 31 and each alternate electrode thereabove in the stack form another set of electrodes. The electrodes of this set are connected together by conductors 49, similar in construction to the conductors 46. A conducting strip 50 connects the next to the lowermost electrode and the other electrodes of the set to a conductor 51 leading to the other secondary 10 on the other side of the transformer.

A wiring diagram of the circuits for the ozonizer assembly unit and for the fan motor 14 is shown in Figure 9 wherein the leads 53 and 54 are connected to the conductors 16 and 17, respectively, leading to the terminals of the motor 14. The primary of the transformer 8 has one end connected by a conductor 55 to the conductor 16 and the other end connected to conductor 17 by a conductor 56.

In operation, when the conductor cord 7 is connected to a suitable source of electro motive power, the transformer 8 is energized and it will generate a sufficiently high voltage to energize the electrodes 31 with a high potential. Due to the stacked arrangement of the oppositely disposed zigzag edges 42 of the electrodes and the resulting concentration of the conducting masses therealong, a plurality of electrical discharges are produced causing generation of ozone. The discharge between the electrodes is luminous and can be seen in a darkened room in the form of coronas. A corona appears on each side of a dielectric plate. The oxygen in the air surrounding the electrodes is changed into ozone and the ozone generated is immediately driven out of the casing and from the vicinity of the electrodes by the currents of air from the fan 15. At the same time, a blast of air passes through the zigzag passages 43 impinging against the entire surface of the electrode and through the vent holes 44 therein, whereby good turbulence and scouring are provided and hence rapid cooling of the apparatus, thus preventing buckling and warping of the electrodes and thus maintaining the efficiency of the apparatus.

In Figures 6 to 8, inclusive, a modified form of ozonizer assembly unit 24' is shown. In this form, an additional electrode in the form of a folded screen 57 surrounds the electrode 31' and both electrodes are clamped between the adjacent mica plates 32' as in the form of Figures 1 to 5, inclusive. The screens space the zigzag edges of the electrodes 31' away from the dielectric plate and thereby afford additional ventilation to the points of generation of the ozone. Furthermore, the opposed summits of the corrugations of the screen wire afford additional points of electrical discharge.

In all other respects, the form of invention shown in Figures 6 to 8, inclusive, is similar to the form shown in Figures 1 to 5, inclusive, and similar reference numbers are used to indicate similar parts.

It will be understood that instead of a single ozonizer assembly unit, a number of such units or banks may be installed in the casing 1 and connected in parallel circuit. It will also be understood that an ozonizer assembly unit may be made with more or fewer electrodes and smaller or larger electrodes and that the thickness of the dielectric plates may be varied, depending upon the voltages employed. In all cases, the ozonator of the invention will produce large volumes of ozone, rapidly and exceptionally efficiently for use in deodorizing and sterilizing, as well as therapeutically.

While I have illustrated and described the preferred embodiments of my invention, it will be further understood that changes in details might be made without departing from the principle of the invention.

What I claim is:

1. An ozone generator comprising, in combination, an electric step-up transformer, an ozone generating assembly unit comprising a stack of electrodes, each electrode including a flat metal bar folded in zigzag form with leg portions connected by loop portions, a dielectric plate interposed between the edges of said leg and loop portions of each two adjacent electrodes, each leg portion of each electrode being arranged in edgewise opposed relation to one leg portion of a next adjacent electrode, means for clamping said bars and plates in abutting relation, conductors for connecting alternate bars to a terminal of a secondary coil of the transformer, and conductors for connecting the remaining bars to the other terminal of the secondary coil of the transformer, said leg portions having transverse openings therethrough and being spaced to provide zigzag air circulating passages therebetween for cooling the electrodes.

2. An ozone generator including at least two electrodes and a sheet of dielectric material between them, each electrode comprising a metal bar rectangular and thin in cross section folded upon itself into a series of leg portions in zig-zag formation, said leg portions being disposed in spaced parallel relation with their wider sides facing each other and with one narrower side of each leg portion of each electrode disposed in edgewise opposed relation to the narrower side of one leg portion of the other electrode, said leg portions having transverse holes therethrough for circulation of air.

3. An ozone generator comprising in combination an electrical step-up transformer, an ozone generating unit comprising a stack of electrodes, each electrode including a single thin strip of metal formed into a plurality of thin integrally connected portions having wide faces and continuous narrow edges, said portions being disposed with their wide surfaces in uniformly spaced opposed relation to each other, a thin dielectric plate interposed between and in contact with the edges of each two adjacent electrodes, each edge of each portion of each electrode being arranged in a common plane with the corresponding edges of the other portions of said electrode and in edgewise opposed relation to one of said portions of a next adjacent electrode, means for clamping said electrode portions and said dielectric plates in abutting stacked relation, means for electrically connecting said electrode portions of alternate electrodes to one terminal of the secondary coil of the transformer, and means for connecting said portions of the other electrodes to the other terminal of said secondary coil of the transformer, said electrode portions being transversely perforated for circulation of air.

References Cited in the file of this patent

UNITED STATES PATENTS

| | | |
|---|---|---|
| 607,007 | Andreoli | July 12, 1898 |
| 743,433 | Blackmarr et al. | Nov. 10, 1903 |
| 1,056,789 | Held | Mar. 25, 1913 |
| 1,125,900 | Darling | Jan. 19, 1915 |
| 1,539,419 | Keiser | May 26, 1925 |
| 1,784,532 | Mershon | Dec. 9, 1930 |
| 1,991,668 | Hartman | Feb. 19, 1935 |
| 2,113,913 | Cragun | Apr. 12, 1938 |